United States Patent [19]

Amada et al.

[11] Patent Number: 5,559,804
[45] Date of Patent: Sep. 24, 1996

[54] WIRELESS COMMUNICATION SYSTEM AND WIRELESS TERMINAL DEVICE USING FIXED LENGTH COMMUNICATION FRAME

[75] Inventors: Eiichi Amada, Tokyo; Yoshihiro Takiyasu, Higashimurayama; Tomoaki Ishifuji, Tokyo; Genichi Ishii, Hachioji; Hidehiko Jusa; Shuichi Adachi, both of Hadano, all of Japan

[73] Assignee: Hitachi, Ltd., Tokyo, Japan

[21] Appl. No.: 230,773

[22] Filed: Apr. 21, 1994

[30] Foreign Application Priority Data

Apr. 21, 1993 [JP] Japan ................... 5-094066

[51] Int. Cl.$^6$ ........................... H04J 3/00
[52] U.S. Cl. ..................... 370/95.3; 455/38.3
[58] Field of Search ................ 370/95.1, 95.2, 370/95.3, 85.2, 85.7, 29, 94.1, 104.1, 85.8, 110.1; 455/53.1, 54.1, 343, 38.3; 340/825.44, 311.1; 379/825.08, 825.07, 825.52

[56] References Cited

U.S. PATENT DOCUMENTS

| | | | |
|---|---|---|---|
| 4,667,193 | 5/1987 | Cotie et al. | 340/895.08 |
| 4,742,335 | 5/1988 | Vogt | 340/518 |
| 4,809,268 | 2/1989 | Tejima et al. | 370/93 |
| 4,998,245 | 3/1991 | Tanaka et al. | 370/85.1 |
| 5,241,542 | 8/1993 | Natarajan et al. | 370/95.3 |
| 5,297,144 | 3/1994 | Gilbert et al. | 370/95.1 |

OTHER PUBLICATIONS

ISO 8802–3 1989 pp. 29–33.
IEEE Network Magazine, Nov. 1991, vol. 5 pp. 31–38 No. 6 "Wireless In–building Network Architecture and Protocols" by Buchhals et al.

*Primary Examiner*—Douglas W. Olms
*Assistant Examiner*—Ajit Patel
*Attorney, Agent, or Firm*—Antonelli, Terry, Stout & Kraus

[57] ABSTRACT

A wireless communication system includes a plurality of wireless terminals and a base station for periodically generating a fixed-length communication frame composed of an information field which includes a plurality of information slots, and first and second control fields which are arranged preceding the information field and each of which includes a plurality of time slots. Each time slot of the first control field of each communication frame is used for allowing the base station to send control data for designating a terminal which is to make the transmission or reception of data in one information slot of the information field, and each time slot of the second control field thereof is used for allowing one wireless terminal to send control data indicating a requirement for assignment of an information slot for data transmission. Each wireless terminal, when receiving control data inclusive of an address of that terminal in the i-th time slot of the first control field of each communication frame, makes the reception or transmission of data in the i-th information slot in the information field of that communication frame. When the control data is not found out in the first control field, the power source of a reception unit of the wireless terminal is turned off during a period of time until the next communication frame is generated.

7 Claims, 5 Drawing Sheets

WIRELESS COMMUNICATION SYSTEM AND WIRELESS TERMINAL DEVICE USING FIXED LENGTH COMMUNICATION FRAME

BACKGROUND OF THE INVENTION

The present invention relates to a wireless communication system. More particularly, the present invention relates to a wireless communication system in which a plurality of wireless terminals communicates with each other through a fixed-length communication frame periodically generated by a base station and also relates to a wireless terminal device which is used in such a wireless communication system.

A wireless LAN (Local Area Network) is a communication system in which wireless terminals connected to the LAN make the transmission and reception of information in units of one packet or frame. In the wireless LAN, a part of a transmission medium such as coaxial cable or optical fiber used in a wire LAN is replaced by a wireless channel.

The construction of a communication frame used in the wire LAN has been disclosed in detail by, for example, ISO 8802-3, "Carrier sense multiple access with collision detection (CSMA/CD) access method and physical specifications" which is the international standard of ISO.

This communication frame is composed of a header portion and an information data portion. The header portion includes a preamble for establishing bit synchronization, a frame flag indicating the head of a frame, a destination address, a source address, and a plurality of fields for indicating the length of data and so forth. Each terminal device analyzes the destination address in a received communication frame to judge whether or not the communication frame is one destined for that terminal itself.

One example of systems, in which a function similar to that of the wire LAN is realized and a part of its communication channel is replaced by a wireless channel, has been disclosed by the article "Wireless In-Building Network Architecture and Protocols", IEEE Network, Vol. 5, No. 6, November 1991 (hereinafter referred to as reference 1).

In a network system disclosed by the reference 1, communication data between wireless terminals is all transmitted through a base station. Access requirements from wireless terminals are scheduled by the base station, and each wireless terminal having data to be sent (or each sending terminal) transmits the data in accordance from an indication from the base station. The base station receives data from a wireless terminal and sends the received data to a receiving terminal designated by a destination address.

A communication frame used in the network system disclosed by the reference 1 is defined to include a first control information field (or time slots) for allowing each sending terminal to send an access request, a data field (or time slots) for allowing an access-granted sending terminal to send a transmission message, and a second control information field (or time slots) for allowing the base station to send information indicative of the grant/no-grant of access, in the mentioned order.

In the wire LAN, it is general that the length of data capable of being sent in the date field of each communication frame is made not shorter than one kilobyte. On the other hand, in the wireless LAN having a high bit error rate in a wireless channel, it is general that each terminal divides a transmission message into a plurality of fragments with relatively short length and sends the message in units of one fragment in order to improve the total transmission efficiency for which the generation of data retransmission is taken into consideration. In the network system of the reference 1, too, the transmission message is sent in a form divided into a plurality of fragments with fixed length. In order to allow a receiving terminal to receive the message in units of one fragment, each fragment is provided with the same address information as address information (or source address and destination address) included in the transmission message. Also, each fragment includes control information for message reassembling and the receiving terminal reassembles the received fragment into the original message on the basis of this control information.

As a wireless channel access system allowing each terminal to control individually data transmission is known, for example, a CSMA (Carrier Sense Multiple Access) system disclosed on pages 208 to 212 of "Packet Switching Technologies and Applications Thereof" published by the Institute of Electronics and Communication Engineers of Japan (hereinafter referred to as reference 2). In the CSMA, each terminal having transmission data detects a carrier at the time of data transmission to check whether or not a channel is used by another user and initiates the transmission of the data after it has been acknowledged that the channel is vacant.

In the wireless LAN system, since cable wiring between a terminal and a base station becomes unnecessary, data communication by a handy terminal using LAN becomes possible. In this case, the realization of a wireless transceiver with small power consumption taken the operation of a buttery into consideration becomes an important problem for the purpose of implementation of small size and light weight of the handy terminal.

In the LAN system, data from another terminal arrives randomly in contrast with a synchronous communication system, for example, a telephone network. Accordingly, in order to allow each wireless terminal to always receive data which arrives from another terminal without notice, that wireless terminal has a need of keeping the power source of its wireless transceiver always in an ON condition.

For example, in the system of the reference 1, unless each wireless terminal reads the destination address of each fragment header in a communication frame, that terminal cannot know whether or not the fragment is destined for that terminal itself. Further, in order to identify the position of the fragment, it is necessary to make synchronization at the head of a communication frame. Therefore, each terminal has a need of keeping its wireless receiver always in an operating condition, thereby repeating the analysis of received data.

In the system of the reference 2, too, each terminal has a need of keeping the power source of the wireless receiver always in an ON condition since data destined for that terminal itself is randomly generated. Namely, there is a problem that the electric power is consumed in a period of time when no available data is received.

SUMMARY OF THE INVENTION

An object of the present invention is to provide a novel wireless communication system which can suppress the power consumption of a wireless receiver of a handy terminal.

Another object of the present invention is to provide a wireless terminal device with small power consumption which can communicate with another terminal or server through a LAN.

A further object of the present invention is to provide a novel communication frame format in a wireless channel for allowing communication between a base station and a plurality of wireless terminals.

To attain the above object, in a wireless communication system according to the present invention, a base station periodically generates a fixed-length communication frame for use for communication with wireless terminals. Each communication frame is composed of an information field including a plurality of time slots (or fragment slots) used for the transfer of data to be sent/received between the wireless terminals and the base station, a first control field including a plurality of time slots (or DA designation slots) used for the transfer of control data for designating a receiving terminal which is to receive data from one of the fragment slots, a second control field (or SA designation slots) used for the transfer of control data for designating a terminal granted to make data transmission to one of the fragment slots, and a third control field including a plurality of time slots (or requirement slots) used for the transfer of access requirement (or a sending requirement) data for requesting the grant of use of one of the fragment time slots for data transmission from a terminal. The first, second and third control fields are positioned preceding the information field.

Each wireless terminal having transmission data (or a sending terminal) transmits sending requirement data inclusive of the address SA of the sending terminal to any time slot (or requirement slot) of the third control field of one communication frame (or the first frame).

The base station receiving the sending requirement data sends reply data to the second control field of the next communication frame (or the second frame). The reply data includes an address (SA) designating a terminal granted to make transmission. For example, the sending terminal finding out its own address in the k-th SA designation slot of the second control field of the above-mentioned communication frame (or second frame) is granted to use the k-th fragment slot of the communication frame. Accordingly, each of a plurality of sending terminals having their addresses designated in the second control fields sends transmission data in a fragment slot having a positional relationship corresponding to an SA designation slot in which its own address is set.

The base station receives data sent by each sending terminal in the information field of the above communication frame (or second frame) and sends the received data to each terminal of destination by use of the information field of the next communication frame (or the third frame or a frame subsequent thereto). In this case, a receiving terminal of data sent by the base station in the i-th fragment slot is designated by the i-th DA designation slot of the first control field. Accordingly, in the case where each terminal finds out its own address with attention paid to the first control field of each communication frame, the terminal is merely required to receive transmission data from a fragment slot having a positional relationship corresponding to a DA designation slot in which its own address is set.

In the case where each wireless terminal does not find out its own address in any DA designation slot of a communication frame, the terminal can determine that transmission data destined for that terminal itself does not exist in that communication frame. Accordingly, in the case where a wireless terminal merely taking a condition of wait for data reception without having a sending requirement does not find out its own address in the first control field, there is no inconvenience even if the power source of the terminal is turned off during a period of time until the generation of the next communication frame so that its receiving function is stopped in order to avoid the consumption of a battery.

In order to elongate the period for stoppage of the receiving function, it is preferable that the first control field having DA slots is arranged preceding the information field having a frame flag and the second and third control fields related to data transmission.

Also, the second and third control field may be arranged preceding the information field. In this case, when a wireless terminal having issued a sending requirement in the preceding communication frame determines from the result of reception of the first control field that there is no transmission data destined for that terminal itself and determines from the result of reception of the second control field that the sending requirement issued by that terminal itself is not granted, it becomes possible to transmit the sending requirement again in the third control field and thereafter to turn the power source off during the period of the information field so that the receiving function is stopped. The fragment slot is longer than the DA designation slot, the SA designation slot and the requirement slot. Therefore, the. battery consumption preventing effect provided by the turn-off of the power source during the information field period cannot be ignored.

A communication frame used in the present invention may have a format in which the above-mentioned second control field for SA designation is unified into the above-mentioned first control field for DA designation so that a plurality of time slots in the same control field are properly used as DA designation slots and SA designation slots.

In this case, control data inclusive of a terminal address to be sent from the base station to each time slot of the first control field may be provided with an identification code indicating whether that time slot is used for DA designation or SA designation.

Also, in the case where each wireless terminal finds out its own address, for example, in the i-th time slot of the first control field, the terminal is merely required to receive data in the i-th fragment slot of the information field if an identification code indicating the DA designation is set in that time slot and the terminal is merely required to send data in the i-th fragment slot of the information field if an identification code indicating the SA designation is set in that time slot.

The base station in the communication system of the present invention is applicable by itself to a communication service for supporting communication between a plurality of wireless terminals in a service area where radio waves reach. The base station is also applicable to a communication service for supporting communication between a wireless terminal in the service area and another terminal outside the service area by connecting this base station to another base station, a plurality of other fixed terminals or another LAN through a transmission path.

In the case where communication between a wireless terminal and another terminal connected to a base station through a transmission path is supported, the base station is provided with a function of inter-conversion between a frame format of data transmitted to the base station in each fragment slot of a wireless channel and the format of a communication frame transmitted on the transmission path.

A wireless terminal device according to the present invention includes a transmitter, a receiver, data processing means for processing a communication frame received by the receiver and supplying transmission data to the transmitter, a timer, and power source control means for making a control for ON/OFF of the power sources of the transmitter and the receiver. The data processing means responds to an interruption signal from the timer to command the power source control means to bring the function of the receiver into an operating condition. In accordance with the contents of control fields of the communication frame received by the receiver, the data processing means commands the power source control means to bring the function of the receiver into a stopped condition. In accordance with the presence/absence of transmission data and the contents of the received control fields, the data processing means commands the power source control means to place the function of the receiver selectively in an operating condition in a predetermined period of time. In a preferred embodiment, the timer generates the interruption signal in coincidence with a predetermined period of generation of the communication frame.

The foregoing and other objects, advantages, manner of operation and novel features of the present invention will be understood from the following detailed description when reading in conjunction with the accompanying drawings.

DESCRIPTION OF THE PREFERRED EMBODIMENTS

Figure 1:
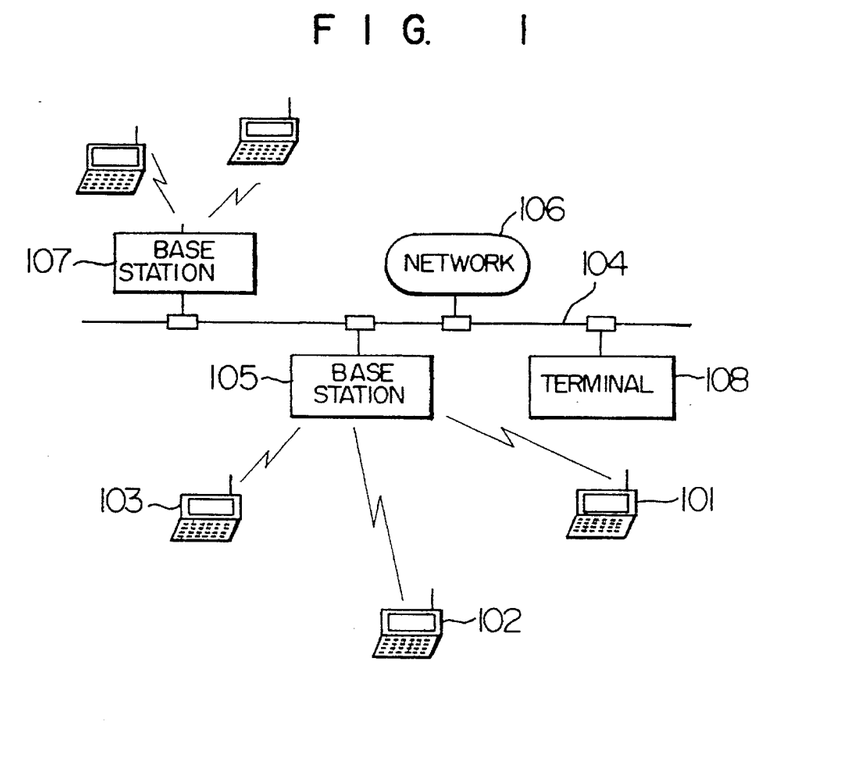
FIG. 1 is a view showing an embodiment of a wireless communication system according to the present invention.

FIG. 1 shows the construction of a wireless LAN system which is an embodiment of a wireless communication system according to the present invention.

The wireless LAN system includes base stations 105 and 107 which are connected by a LAN transmission cable 104 and a plurality of wireless terminals 101, 102, 103,—which make the transmission and reception of data to and from each base station by a wireless channel. The LAN transmission cable 104 is also connected to fixed terminals 108,— and another network 106.

Communication between wireless terminals positioned within a service area of the base station 105 and communication between those wireless terminals and the fixed terminal 108, the other base terminal 107, another terminal device included in the network 106 or a host computer are all made through the base station 105.

Each base station periodically generates a fixed-length communication frame of a predetermined format which is composed of an information field and a plurality of control fields, schedules an access requirement issued in a predetermined control field of one communication frame by the plurality of wireless terminals 101, 102 and 103 in the service area, and designates, in one control field of the next generated communication frame, a relationship between a wireless terminal which is granted to make data transmission and a time slot which is to be used for the data transmission by that terminal. Each wireless terminal granted to make data transmission sends data in a time slot of the information field of the above communication frame which is designated by the base station. Those transmission data are temporarily stored in the base station 105. Designating in the next generated communication frame a relationship between a destination terminal (or receiving terminal) of the data and a time slot in which the data is to be received, the base station 105 sends the temporarily stored data.

Figure 2:
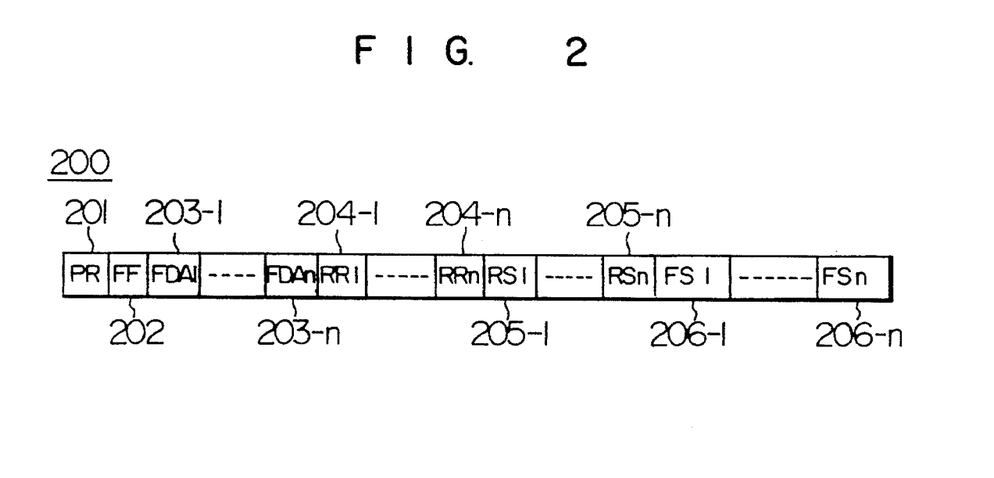
FIG. 2 is a diagram showing the format of a communication frame with a plurality of fragment slots used in a wireless channel of the wireless communication system according to the present invention.

FIG. 2 shows the format of a communication frame 200 which is used in the wireless channel in the present invention. Each communication frame is composed of:

- a preamble (PR) field 201 including a bit pattern for allowing a receiver of each wireless terminal to establish bit synchronization;
- a frame flag (FF) field 202 including a fixed pattern indicative of the head of the frame;
- a first control field 203 (203-1 to 203-n) including a plurality of fragment DA slots (FDA1 to FDAn) for designating the address of a wireless terminal which is to receive data from fragment slots (FS1 to FSn) 206-1 to 206-n which form an information field, wherein a wireless terminal address-designated by the i-th fragment DA slot (FDAi) 203-i receives data in the i-th fragment slot (FSi);
- a second control field 204 (204-1 to 204-n) including a plurality of request reply slots (RR1 to RRn) for designating the address of a wireless terminal granted to make data transmission in one fragment slot, wherein a wireless terminal address-designated by the j-th request reply slot (RRj) has a data transmission right in the j-th fragment slot (FSj);
- a third control field 205 (205-1 to 205-n) including a plurality of request slots (RS1 to RSn) in which a wireless terminal having data to be sent issues a requirement for assignment of one fragment slot; and The information field 206 (206-1 to 206-n) including the plurality of fragment slots (FS1 to FSn) used for transfer of data to be sent and received between the wireless terminals and the base station.

Figure 3:
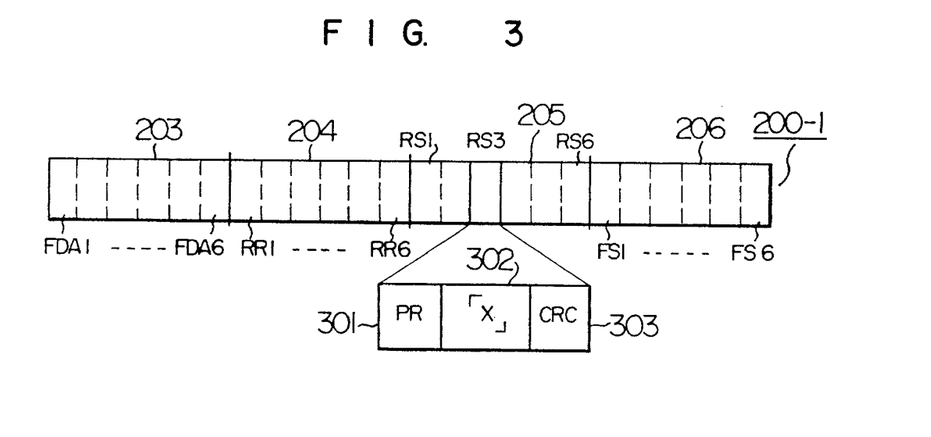
FIG. 3 is a diagram for explaining a relationship between the communication frame and sending requirement data from a wireless terminal.

In the wireless communication system of the present invention, a wireless terminal having data to be sent identifies the position of the third control field 205 of a communication frame 200-1 with reference made to the preamble 201 and the frame flag 202 of the communication frame 200-1 and randomly selects one of request slots 205-1 to 205-n, as shown in FIG. 3, to issue a fragment slot access requirement (or sending requirement).

The sending requirement is composed of a preamble 301, an address 302 indicative of a requester wireless terminal, and a 2-byte error check code (CRC) 303. The address may include, for example, a 48-bit MAC (Media Access Control) address. Since access to the request slot 205 is randomly made from each wireless terminal, each request slot has the preamble 301 at the head thereof in order that a base station receiving the access requirement can establish bit synchronization.

In the case where a plurality of wireless terminals issue the sending requirements simultaneously for the same request slot 205k, the base station can recognize the generation of collision since the error check code 303 indicates an error. The contents of the request slot 205k subjected to the generation of collision are ignored.

Figure 4:
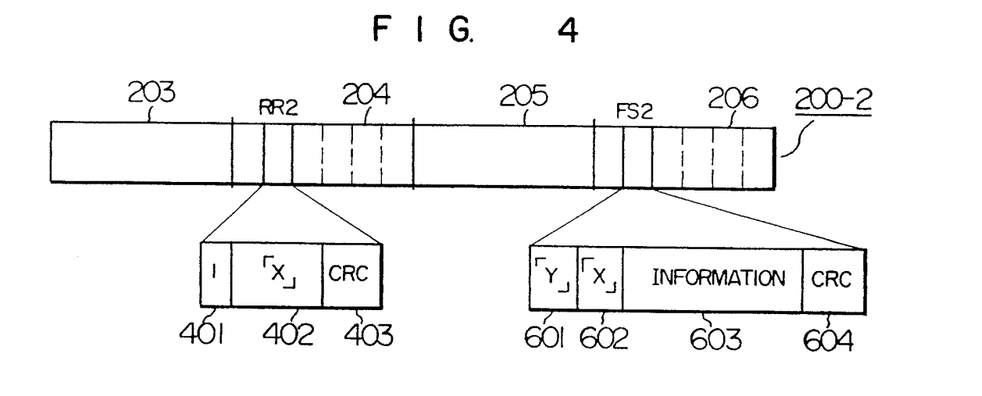
FIG. 4 is a diagram for explaining a relationship between the communication frame, reply data from a base station for a sending requirement and transmission data from a wireless terminal sent to a fragment slot.

The base station 105 performs a processing for assignment of a vacant fragment for the sending requirement received in the third control field of the communication frame 200-1 and sends request reply data in a request reply slot of the second control field 204 of the next generated communication frame 200-2, as shown in FIG. 4.

The request reply data includes a code 401 indicative of the direction of transmission of data, an address (SA) 402 indicative of a wireless terminal granted to make data transmission, and an error check code (CRC) 403. The data transmission direction code 401 is "0" in the case where the designated fragment slot is used for data. transmission from the base station to the wireless terminal and "1" in the case where the designated fragment slot is used for data transmission from the wireless terminal to the base station.

A wireless terminal address-designated to the i-th request reply slot 204-i is granted to use the i-th fragment slot 206-i of the information field. Thus, in the case where each wireless terminal issuing a sending requirement in the preceding communication frame 200-1 finds out its own device address in one reply slot of the second control field, for example, the i-th reply slot, the wireless terminal sends data to the i-th fragment slot 206-i of the communication frame 200-1. Data sent to one fragment slot 206-i includes a destination address (DA) 601, a source address (SA) 602, data (or information) 603 and an error check code 604.

In the case where a wireless terminal cannot find out its own terminal address notwithstanding that it issued a sending requirement in the preceding communication frame 200-1, the wireless terminal judges the sending requirement as having collided with a sending requirement from another terminal or as having been ignored and therefore sends the sending requirement again in the third control field 205 of the communication frame 200-2 or the subsequent communication frame 200-3.

Figure 5:
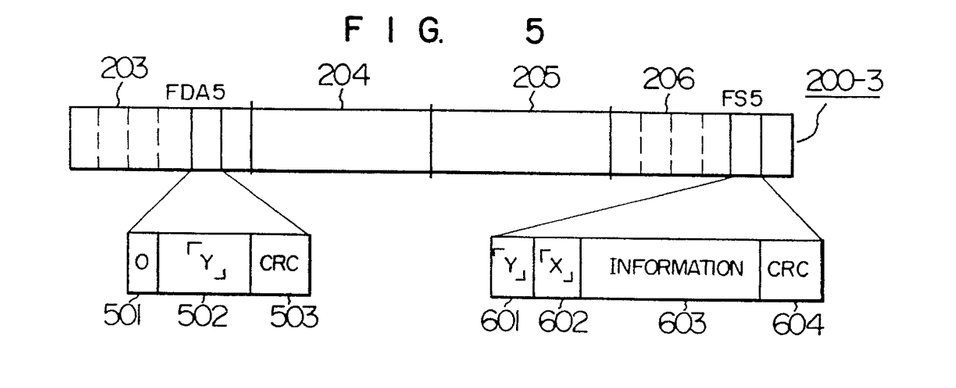
FIG. 5 is a diagram for explaining a relationship between the communication frame, data designating a receiving terminal and transmission data.

The base station 105 temporarily stores data received from the wireless terminals in the information field 206 and sends the stored data in the next generated communication frame 200-3 to wireless terminals of destination, as shown in FIG. 5.

In this case, the wireless terminal of destination is designated by a fragment DA slot in the first control field 203. The contents of one fragment DA slot 203-i include a code 501 indicative of the direction of data transmission, a terminal address (DA) 502 indicative of a terminal which is to receive the data, and an error check code 503.

Data to be received by a wireless terminal address-designated to the i-th fragment DA slot 203-i is sent from the base station in the i-th fragment slot 206-i of the information field. Thus, each wireless terminal pays attention to the first control field and receives, when its own terminal address is found out, data in a fragment slot corresponding to a time slot in which this address is received. If each terminal cannot find out its own address in the first control field, the terminal has no data to be received in the information field 206. Therefore, if the terminal itself has not issued a sending requirement in the preceding communication frame, the terminal may stop its transmission and reception function until the next communication frame 200-4 comes.

The above explanation of FIGS. 3 to 5 with attention paid to one wireless terminal having a sending requirement has been made of a progression from the issuance of the sending requirement by this terminal to the reception of the sending requirement by a terminal of destination. However, it is obvious that the base station 105 performs, in each communication frame, the designation of a receiving terminal (in the first control field), a request reply (in the second control field), the reception of a sending requirement (in the third control field) and the reception of data from a terminal and the transmission of data from the base station (in the information field) in a mixed form.

The base station performs a relay process corresponding to the destination address of data in the case where communication data between a wireless terminal positioned in the wireless service area and another terminal connected through the LAN 104 is received. For example, in the case where message data destined for a wireless terminal is received from the LAN 104, the base station sends the message data into the air after conversion thereof into a data block adapted for a fragment 206i. If one reception message is divided into a plurality of fragments, a plurality of fragment slots in the same communication frame can be used to continuously send the data to one wireless terminal. The divisional fragments from one reception message may be sent in a plurality of continuous communication frames.

Figure 6:
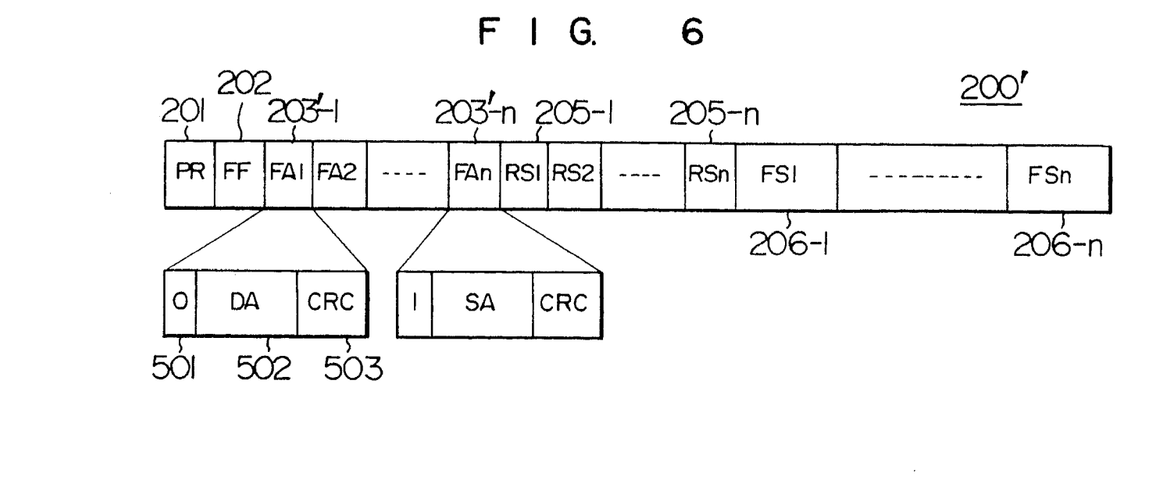
FIG. 6 is a diagram showing another embodiment of a communication frame format which can be used in the wireless channel of the wireless communication system according to the present invention.

FIG. 6 shows a modified example of a communication frame applied in the wireless communication system of the present invention.

In the shown communication frame 200', the first and second control fields 203 and 204 in FIG. 2 are unified so that a plurality of fragment address slots (FA1 to FAn) 203'-1 to 203'-n forming a control field 203' are properly used for the designation of DA address and the designation of SA address.

The number n of fragment address slots coincides with the number of fragment slots (FS1 to FSn) 206-1 to 206-n included in an information field 206.

The fragment slot is used for either the transmission of data from a wireless terminal or the transmission of data destined for a wireless terminal from a base station. The fragment slot in the former case is used by a terminal designated by the DA address and the fragment in the latter case is used by a terminal designated by the SA address. Accordingly, if ones of the fragment address slots (FA1 to FAn) 203'-1 to 203'-n used for SA address designation are set with, for example, an identification code "1" and slots thereof used for DA address designation are set with an identification code "0", a wireless terminal finding out its own address in one slot 203'-j of the control field 203 can make, on the basis of the value of the identification code included in that slot, the judgement of whether that terminal is to sent data or receive data in the j-th fragment slot 205-j.

Figure 7:
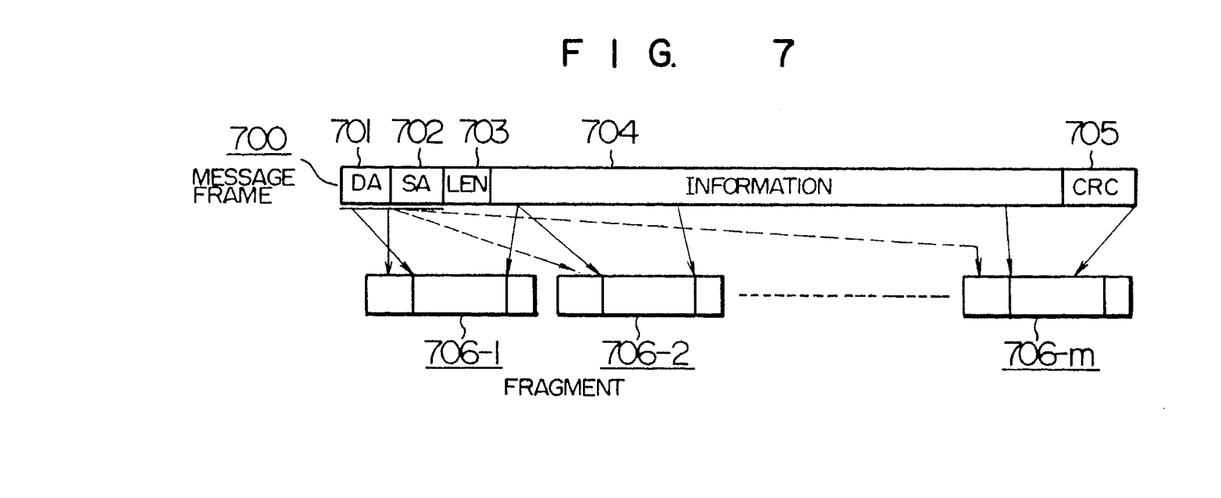
FIG. 7 is a diagram showing a relationship between a transmission message and fragments.

FIG. 7 shows a relationship between the format of a message 700 handled by each terminal and fragments.

The length of the message 700 is variable. The message 700 is composed of a destination address (for example, 6 bytes) 701, a source address (6 bytes) 702, an information field length (6 bytes) 703, a variable-length information field 704 and an error correction code (4 bytes) 705.

The message packet 700 is divided into a plurality of fixed-length fragments 706-1 to 706-m. Each fragment with a destination address 601 and a source address 602 (see FIG. 4) provided at a header portion and with an error check code 604 provided at a rear portion is sent to the fragment slots 206-1 to 206-n of a communication frame of a wireless channel. The destination and source addresses 601 and 602 of each fragment are respectively provided with the copies of the destination and source addresses (DA) 701 and (SA) 702 of the message 700.

The length of one fragment and the number n of fragments capable of being sent by one communication frame 200 may be designed, synthetically considering a modulation and demodulation technique used by a transceiver of the wireless terminal or the base station, radio transmission environment, and so forth.

Figure 8:
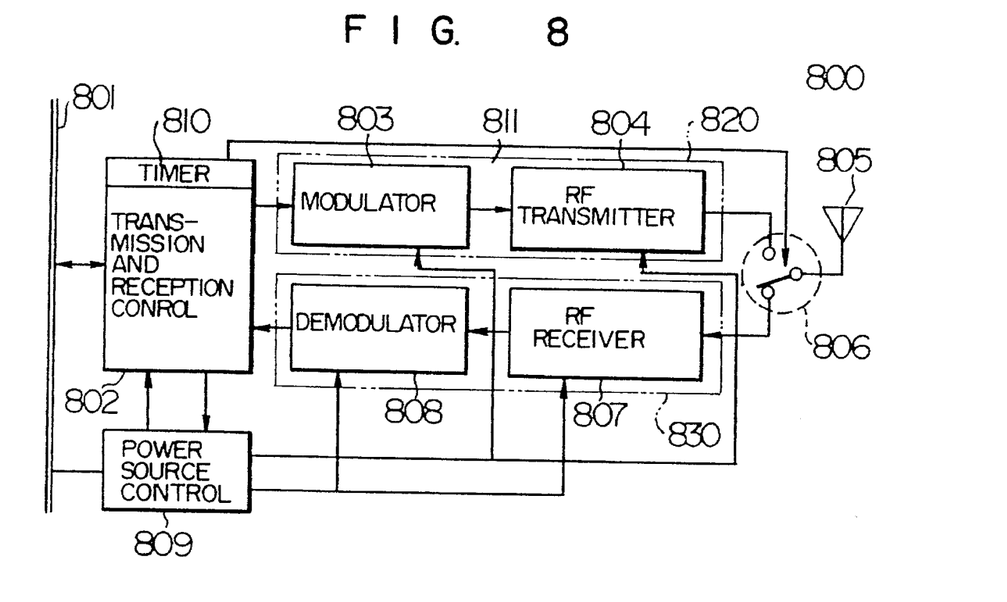
FIG. 8 is a block diagram showing an embodiment of a wireless terminal device according to the present invention.

FIG. 8 shows the construction of a wireless transceiver 800 with which the wireless terminal 101, 102 or 103 is provided.

The transceiver 800 is connected to a data processor (not shown) such as a personal computer or the like (hereinafter referred to as terminal device) which is coupled to a bus 801. Reference numeral 802 denotes a transmission and reception control section which is connected to the system bus 801 of the terminal and performs a processing for transfer of transmission data and reception data to and from the terminal device and an access control for the wireless channel.

A transmission message generated by the terminal device is temporarily stored in the transmission and reception control section 802 and is then supplied to a transmission unit 820, which includes a modulator 803 and a high frequency (RF) transmitter 804, with a form divided into fixed-length fragments and at a timing according to the protocol of a communication frame periodically generated by the base station. An output signal from the modulator 803 modulated in accordance with the contents of the fragments are outputted at a carrier frequency of the RF transmitter 804 into the air from an antenna 805 through a switch 806.

On the other hand, a signal from the base station received by the antenna 805 is inputted through the switch 806 to a reception unit 830 which includes a high frequency (RF) receiver 807 and a demodulator 808. The reception signal demodulated by the demodulator 808 into a digital signal is inputted to the transmission and reception control section 802. The transmission and reception control section 802 assembles the received fragments into a message which is in turn sent to the terminal device through the bus 801.

The transmission and reception control section 802 changes over the transmission/reception mode of the antenna 805 by counting the output of a timer 810 in synchronism with the period of generation of a communication frame to generate a change-over signal onto a control line 811 so that a period of time from the head of each communication frame to the second control field thereof provides a reception mode and a period of time from the third control field of the communication frame to the end thereof provides a transmission mode.

Reference numeral 809 denotes a power source control circuit which receives the supply of an electric power from a power line of the bus 801 to selectively supply the electric power of the power source to each part of the transceiver. In the present embodiment, the supply of the electric power is independently made to the transmission unit 820, the reception unit 830 and the transmission and reception control section 802.

When the power source is brought into a turned-on condition, the electric power is supplied to the transmission and reception control section 802 and the selective power supply having a limited supply period is made for the transmission unit 820 and the reception unit 830 by virtue of a power source control function of the transmission and reception control section 802, as will be mentioned later on.

Figure 9:
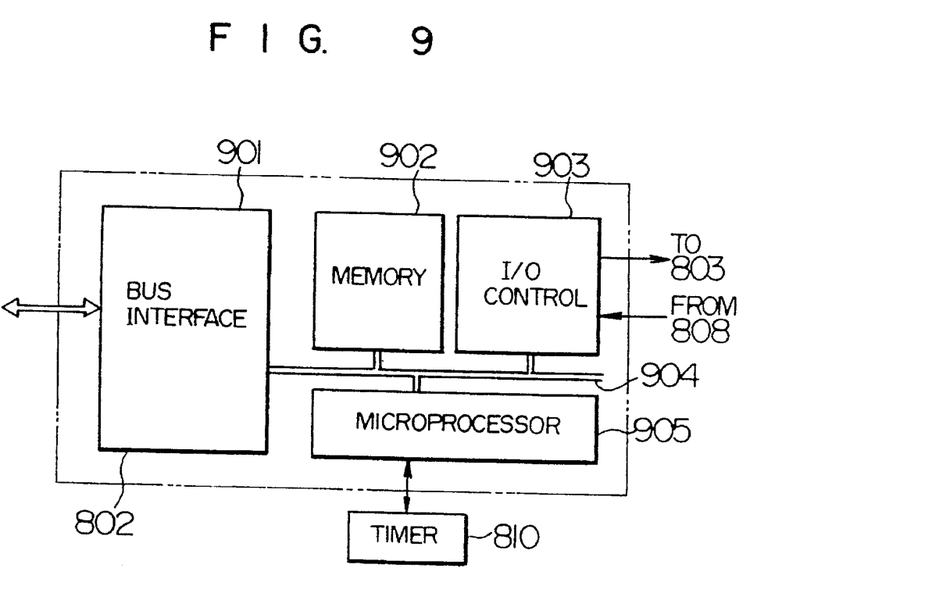
FIG. 9 is a diagram showing an embodiment of a data processing section or transmission and reception control section of the wireless terminal device.

FIG. 9 shows the construction of the transmission and reception control section 802.

The transmission and reception control section 802 includes a bus interface 901 for making the transmission and reception of data to and from the system bus 801, a memory 902 having buffer areas for temporarily storing transmission data and reception data and a program storage area, an I/O controller 903 for controlling the transmission data to the modulator 803 and the reception of data from the demodulator 808, a microprocessor 905 for performing a control for the transmission and reception of data to and from the host processor (or the terminal device) and a protocol processing for a communication frame, and an internal bus 904 for interconnecting the above components. The microprocessor 905 is connected to the timer 810 for initiating a data transmission and reception processing in each communication frame in response to an interruption signal from the timer 810 to perform the transmission/reception mode change-over, the power supply control and the identification of a time slot in each communication frame by a software timer, as will be mentioned later on.

A transmission message supplied through the bus interface 901 from the terminal device is temporarily stored in the transmission buffer area of the memory 902 and is then divided by the microprocessor 905 into a plurality of fragments. After having issuing the above-mentioned sending requirement, the microprocessor 905 outputs each fragment to the modulator 803 through the I/O controller 903 at the timing of a time slot designated by the base station.

On the other hand, reception data inputted from the demodulator 808 is stored in the reception buffer area of the memory 902 through the I/O controller 903. Confirming the reception of the last fragment of each message, the microprocessor 905 assembles one message from a plurality of fragments and transfers the assembled message to the terminal device through the bus interface 901. In addition to the above-mentioned data transmission and reception processing, the microprocessor 905 performs processings including an access control for wireless channel, a control for retransmission of sending requirement and transmission data, an antenna change-over control, a power ON/OFF control mentioned later on, and so forth.

Figure 10:
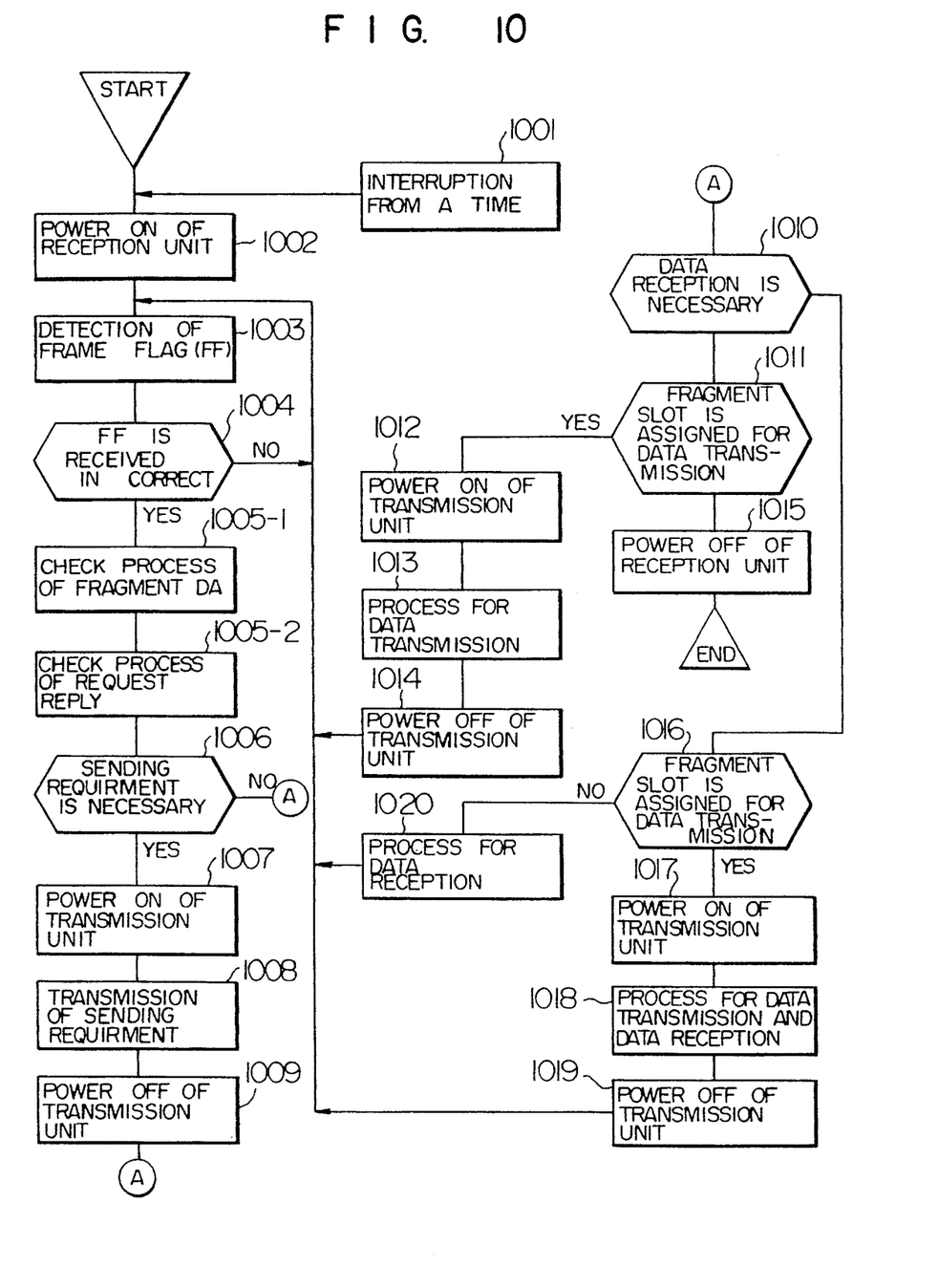
FIG. 10 is a flow chart showing a power source control algorithm performed by the transmission and reception control section of the wireless terminal device.

FIG. 10 shows a flow chart showing a transmission and reception processing and a power source control algorithm performed by the transmission and reception control section 802 in a wireless terminal.

When the power supply of the transmission and reception control section 802 is turned on, the transmission and reception control section 802 first issues a command for the power-ON of the reception unit 830 to the power source control circuit 809 (step 1002) and checks the pattern of a digital signal inputted from the reception unit 830 to wait for the detection of a frame flag (FF) 202 positioned at the header portion of each communication frame 200 (step 1003).

If the frame flag (FF) 202 is received in correct (step 1004), the check is made of whether or not an address designating that wireless terminal (or MAC address) or a broadcast address exists in each fragment DA slot 203-i (i=1 to n) of the first control field 203 positioned after the FF field (step 1005-1).

In the case where the address designating that wireless terminal or the broadcast address is found out, it is ascertained that data to be subjected to a reception processing is present in the i-th fragment slot 206-i corresponding to the fragment DA slot 203-i which includes the address. In the case where an error is generated in the address 502 received in the fragment DA slot 203-i, an error correction is made by an error correction code 503 received in this slot.

Next, the check is made of whether or not the address designating that wireless terminal exists in each request reply slot 204-i (i=1 to n) present in the second control field following the first control field (step 1005-2). If the address designating that wireless terminal is found out, it is ascertained that the i-th fragment slot 206-i corresponding to the request reply slot 204-i with the address is granted to make data transmission.

The judgement is made of whether or not transmission data to be sent in the next communication frame exists in the transmission buffer (step 1006). In the case where the transmission data exists, a command for the power-ON of the transmission unit 820 is issued the power source control circuit 809 (step 1007), a sending requirement is outputted in any request slot 205-i of the third control field (step 1008). Thereafter, a command for the power-OFF of the transmission unit 820 is issued to the power source control circuit 809 (step 1009).

As the results of address check made in steps 1005-1 and 1005-2, one of the following four processings (a) to (d) is performed depending upon whether or not a fragment slot for which that wireless terminal is to make a data reception operation (or a fragment slot assigned for reception operation) or a fragment slot for which that wireless terminal is to make a data transmission operation (or a fragment slot assigned for transmission operation) exists in the information field 206 of the communication frame of interest. The position of the fragment slot assigned for transmission operation or reception operation is identified by the software timer.

(a) In the case where there are neither the fragment assigned for reception operation nor the fragment assigned for transmission operation (or in the case where the results of judgement in steps 1010 and 1011 are both negative), a command for the power-OFF of the reception unit 830 is issued to the power source control circuit 809 and the timer 810 is set such that a timer interruption is generated at a timing immediately before the head of the next communication frame is received (step 1015), thereby completing the processing in the communication frame of interest. In this case, when the base station generates the next communication frame, the power source of the reception unit 830 is brought into a turned-on condition in response to the interruption signal generated by the timer 810 in synchronism with the generation of the next communication frame (step 1002). Thus, the above-mentioned steps are repeated for this next communication frame.

(b) In the case where there is not the fragment assigned for reception operation but there is the fragment assigned for transmission operation (or in the case where the result of judgement in step 1010 is negative and the result of judgement in step 1011 is affirmative), a command for the power-ON of the transmission unit 820 is issued to the power source control circuit 809 (step 1012) and transmission data is sent at a timing coincident with the designated fragment slot 206-i (step 1013). Thereafter, a command for the power-OFF of the transmission unit 820 is issued to the power source control circuit 809 (step 1014) to return to step 1003.

(c) In the case where there are both the fragment assigned for reception operation and the fragment assigned for transmission operation (or in the case where the results of judgement in steps 1010 and 1011 are both affirmative), a command for the power-ON of the transmission unit 820 is issued to the power source control circuit 809 (step 1017) and a reception processing or transmission processing is performed in each designated fragment slot (step 1018). Thereafter, a command for the power-OFF of the transmission unit 820 is issued to the power source control circuit 809 (step 1019) to return to step 1002.

(d) In the case where there is the fragment assigned for reception operation but there is not the fragment assigned for transmission operation (or in the case where the result of judgement in step 1010 is affirmative and the result of judgement in step 1011 is negative), the reception processing is performed in the designated fragment slot (step 1020) and thereafter the flow returns to step 1002.

The above embodiment has been shown on the assumption that each communication frame has a frame format shown in FIG. 2 in which the SA address and the DA address are designated by the separate control fields, respectively. However, in the case where a communication frame having a frame format shown in FIG. 6 is used, the address checking steps 1005-1 and 1005-2 can be unified.

In this case, the judgement of whether that wireless terminal is to make a reception operation or a transmission operation in the fragment slot 206-i may be made in accordance with the value of an identification code 501 included in the time slot 202'-i in which the address of that wireless terminal is found out.

In the foregoing embodiment, in the case where there is no sending requirement, the power source of the reception unit 830 is turned off after a request reply has been checked in the second control field. However, the power source of the reception unit may be turned off at the point of time when it is ascertained as the result of address check in the first control field that a fragment assigned for reception operation does not exist in the communication frame of interest.

In the foregoing embodiment, in the case where there is a fragment assigned for data transmission operation, the power source of the transmission unit 820 is turned on at the head of the information field 206 and is turned off after a fragment transmission operation in the designated slot (and a fragment reception operation, as required) is completed. However, the power source of the transmission unit may be in a turned-on condition only during a specified time slot period assigned for data transmission operation.

In the foregoing embodiment, when data transmission is to be made, the power source of the reception unit 830 is kept in a turned-on condition during the entire period of a communication frame. However, the power source of the reception unit 830 may be controlled so that it is turned off once in the course of the communication frame and is in a turned-on condition only during a specified time slot period in the information field assigned for data transmission operation. In this case, the timer setting for generating a timer interruption signal in synchronism with the next communication frame may be carried out at the point of time when a reception operation in a fragment slot is completed or immediately after step 1004 in all the cases (a) to (d).

In the case where the transmission unit or the reception unit involves a delay time Δt until the circuit operation becomes stable after the turn-on of the power source of the unit, a control command to the power source control circuit may be issued at a timing with the delay time At being taken into consideration.

As apparent from the foregoing explanation, in the present invention, a wireless terminal judges the presence/absence of a fragment slot assigned for transmission/reception operation at the head portion of each communication frame so that the power source of the reception unit and/or the transmission unit can be selectively turned on only in a required period of time. Therefore, it is possible to reduce the consumption of the battery of a handy wireless terminal.

In the communication frame shown in FIG. 2, assume as one example that the preamble field is 80 bits, the frame flag field is 32 bits, the fragment DA slot is 65 bits, the request reply slot is 65 bits, the request slot length is 144 bits, the fragment slot length is 2048 bits and the number n of fragment slots is 4. Then, the information field amounts to 2048×4=8192 bits and the control field and the other fields amount to 80+32+(65+65+144)×4=1176 bits. In the case where there is no transmission data to be received, the power source control in the present invention makes it possible to reduce the power consumption by 8192/(8192+1176)≈ about 87%.

It is to be understood that the above-described embodiments are merely illustrative of the principles of the invention and that many variations may be devised by those skilled in the art without departing from the spirit and scope of the invention. It is therefore intended that such variations be included within the scope of the claims.

We claim:

1. A wireless communication system comprising:
 a plurality of wireless terminals having their individual addresses; and
 a base station for periodically generating a fixed-length communication frame composed of an information field which includes a plurality of information slots, and a first control field and a second control field which are arranged preceding said information field, said first control field being divided into a plurality of time slots each being used for allowing said based station to send control data each including an address of a terminal which should make transmission or reception of data in said information field of said communication frame, said second control field being divided into a plurality of time slots each being used for allowing one of said plurality of wireless terminals to send control data indicating a slot access requirement for requesting assignment of at least one information slot in a next communication frame for data transmission;
 each of said plurality of wireless terminals including:
  judgement means for judging, from the address in first control field of said communication frame, whether or not said wireless terminal is designated by said base station,
  control means for making, when said judgement means detects said wireless terminal is designated by control data transmitted in an i-th time slot of said first control field, reception or transmission of data in an i-th information slot in said information field of said communication frame, wherein i is a positive integer representing a location of said i-th time slot in said first control field and a location of said i-th information slot in said information field; and
  means for transmitting control data in one of said plurality of time slots of said second control field of said communication frame to request at least one information slot in the next communication frame for data transmission when transmission data to be sent has been prepared.

2. A wireless communication system comprising:
 a plurality of wireless terminals having their individual addresses; and
 a base station for periodically generating a fixed-length communication frame composed of an information field which includes a plurality of time slots for use in sending transmission data, and a first control field, a second control field and a third control field which are arranged preceding said information field, each of said control fields including a plurality of time slots, each time slot of said first control field of said communication frame being used for allowing said based station to send control data for designating a terminal which should make data reception in said information field of said communication frame, each time slot of said second control field of said communication frame being used for allowing said base station to send control data for designating a terminal which should make data transmission in said information field of said communication frame, each time slot of said third control field of said communication frame being used for allowing one of said plurality of wireless terminals to send control data indicating a slot access requirement for requesting assignment of at least one time slot for data transmission;
 each of said plurality of wireless terminals including:
  means for receiving when an address of said wireless terminal is found in an i-th time slot of said first control field of a communication frame, data in an i-th time slot in said information field of said communication frame, wherein i is a positive integer representing a location of said i-th slot in said first field and said information field, and
  means for sending, when said address of said wireless terminal is found in a j-th time slot of said second control field of said communication frame, data in an j-th time slot in said information field of said communication frame, where j is a positive integer representing a location of said j-th time slot in said second control field and said information field.

3. A communication method in a wireless communication system comprising a plurality of a wireless terminals and a base station for periodically generating a fixed-length communication frame composed of an information field which includes a plurality of time slots for use in sending transmission data, and a first control field and a second control field arranged preceding said information field, each of said control fields including a plurality of time slots for use in sending control data,
 wherein each of said plurality of wireless terminals performs:
  a step of sending when transmission data to be sent has been prepared, control data indicative of an information slot requirement in one of said time slots of the second control field of a communication frame generated by said base station;
  a step of checking control data received from the first control field of said communication frame to determine whether or not the wireless terminal has been designated by said base station;
  a step of sending when control data received at an j-th time slot of the first control field of said communication frame is reply data for said information slot requirement issued by the wireless terminal in the preceding communication frame, transmission data with header information to a j-th information slot in the information field of said communication frame wherein j is a positive integer representing a location of the j-th time slot in said first control field and said information field, said header information including a destination address and a source address; and a step of receiving when control data received at a k-th time slot of the first control field of said communication frame designates the wireless terminal to receive transmission data in the information field, data in a k-th information slot in the information field of the communication frame, wherein k is a positive integer representing a location of the k-th time slot in said first control field and said information field, and wherein said base station performs:

a step of receiving information slot requirements from the second control field of each communication frame;

a step of receiving transmission data sent by at least one of said wireless terminals from the information field of said communication frame;

a step of sending in at least one time slot of the first control field of each communication frame, control data for designating one of said wireless terminals which should perform data reception or data transmission at the information field of the communication frame, and sending each transmission data received from the preceding communication frame in the communication frame by using one of the information slots having a location corresponding to said time slot of the first control field in which said control data is sent to designate the wireless terminal which is to perform data reception.

4. A communication method in a wireless communication system comprising a plurality of wireless terminals and a base station for periodically generating a fixed-length communication frame composed of an information field which includes a plurality of information slots for use in sending of transmission data, and a first control field and a second control field which are arranged preceding said information field, each of said control fields including a plurality of time slots for use in sending of control data, the method comprising:

a first step of sending by at least one wireless terminal control data for requesting at least one information slot in one of said time slots of the second control field of the i-th communication frame generated by said base station, wherein i is a positive integer;

a second step of receiving by said base station said control data indicative of the requirement of information slot from each time slot of the second control field of said i-th communication frame;

a third step of sending by said base station reply data for designating at least one wireless terminal which is allowed data transmission, into at least one of the time slots of the first control field of an (i+1)-th communication frame based on the control data received in said second step;

a fourth step of receiving, by each wireless terminal which has sent said control data for requesting the information slot in said first step, the reply data from said time slots of the first control field of said (i+1)-th communication frame;

a fifth step of sending by each wireless terminal which has been designated by the reply data received from the first control field of said (i+1)-th communication frame, transmission data with header information into an information slot in the information field of said (i+1)-th communication frame, said information slot being specified by a location of said time slot of the first control field from which said reply data designating the wireless terminal has been received, said header information including a destination address and a source address;

a sixth step of receiving by said base station the transmission data with said header information from the information field of said (i+1)-th communication frame;

a seventh step of sending by said base station control data indicative of the destination address of the transmission data which has been received in said sixth step into one of time slots of the first control field of an (i+2)-th communication frame and the transmission data with said header information received in said sixth step into one of the information slots of said (i+2)-th communication frame, a location of said information slot corresponding to the location of said time slot of the first field by which said control data has been sent;

an eight step of receiving by each of said plurality of wireless terminals, the control data sent out by said base station in the first control field of said (i+2)-th communication frame; and a ninth step of receiving by each wireless terminal designated by the destination address in the control data received in said eighth step, the transmission data from an information slot specified by the location of the time slot of said first control field at which the wireless terminal has designated.

5. A communication method according to claim 4, wherein the wireless terminal which has issued the requirement in said first step resends the control data for requesting at least one information slot into one of time slots of the second control field of said (i+1)-th communication frame in the case where it is determined from the result of reception of the first control field of said (i+1)-th communication frame in said fourth step that the requirement of that wireless terminal is not granted.

6. A communication method according to claim 4, wherein in said seventh step, said base station sends into one of time slots of the first control field of said (i+2)-th communication frame reply data for a new requirement for an information slot which was issued by one of said wireless terminals at the second field of said (i+1)-th communication frame.

7. A communication method according to claim 4, wherein each wireless terminal of said plurality of wireless terminals, which does not correspond to the destination address included in any control data received in said eighth step, stops a receiving function thereof until the next communication frame is generated.

* * * * *